United States Patent
Malloy et al.

[11] Patent Number: 6,101,678
[45] Date of Patent: Aug. 15, 2000

[54] ADJUSTABLE HANDLE FOR A MANUALLY MOVABLE VEHICLE

[75] Inventors: Molly A. Malloy, Parma; Howard L. Loewenthal, Westlake, both of Ohio

[73] Assignee: Invacare Corporation, Elyria, Ohio

[21] Appl. No.: 09/191,745

[22] Filed: Nov. 13, 1998

[51] Int. Cl.[7] .................................. B62B 7/00; A45F 5/10
[52] U.S. Cl. .................................. 16/438; 16/900; 16/445; 16/430; 280/47.371; 403/DIG. 4; 403/87; 403/409.1
[58] Field of Search ........................... 16/438, 436, 900, 16/445, 324, 325, 430; 280/655, 655.1, 47.315, 47.371; 403/DIG. 4, 87, 91, 409.1

[56] References Cited

U.S. PATENT DOCUMENTS

| | | | |
|---|---|---|---|
| 2,427,384 | 9/1947 | Bushko | 16/325 |
| 3,629,900 | 12/1971 | Beerli, Jr. | 16/325 |
| 5,062,179 | 11/1991 | Huang | 280/47.371 |
| 5,146,808 | 9/1992 | Hoshino | 403/91 |
| 5,168,601 | 12/1992 | Liu | 280/655.1 |
| 5,319,992 | 6/1994 | Shui-Te | 16/438 |
| 5,813,258 | 9/1998 | Cova et al. | 403/409.1 |
| 5,845,916 | 12/1998 | Stroud | 16/436 |

*Primary Examiner*—Chuck Y. Mah
*Attorney, Agent, or Firm*—Hudak & Shunk Co.

[57] ABSTRACT

A handle for a manually movable vehicle or other article, such as a stroller, is infinitely adjustable to enable the person or persons imparting motion to the vehicle to achieve the greatest leverage and/or comfort. A height-adjustment assembly is disposed between and interconnects each extension rod and handlebar of the handle. The height-adjustment assembly includes a plurality of clutch plates and a locking lever having a cam end. The locking lever is manually moved between a locked position in which the lever cam end causes abutment of and friction between the clutch plates thereby preventing relative movement of the plates and securing the handlebar at a selected height, and an unlocked position in which the lever cam end reduces friction between the clutch plates so that the plates are movable relative to one another to enable pivotal movement and height adjustment of the handlebar.

11 Claims, 6 Drawing Sheets

6,101,678

ADJUSTABLE HANDLE FOR A MANUALLY MOVABLE VEHICLE

BACKGROUND OF THE INVENTION

1. Field of the Invention

The invention relates to adjustable handles and in particular to an adjustable handle useful in manually moving a small vehicle or other movable article such as a stroller or the like. More particularly, the invention is directed to an adjustable handle for manually movable small vehicles, which is infinitely adjustable for the comfort of the person moving the vehicle.

2. Background Art

Handles have been utilized for many, many years as a convenient and effective way for one or more individuals to manually impart motion to small vehicles and other movable articles such as strollers, wheelchairs, lawn mowers, and the like. Some of these handles have been embodied as one-piece members and others as a separate handle for each hand of the person or people providing the manual movement to the vehicle. Inasmuch as the size and weight of the vehicle, its center of gravity, and the size and height of the person providing the manual effort to move the vehicle, all can be variable, adjustment of the handle to a height which provides the greatest leverage to the person moving the vehicle often is desired. However, adding such a handle height adjustment can add unwanted expense to the vehicle, be relatively difficult to adjust, and even lessen the stability of the handle. Also, many adjustable handles fail to provide continuous or infinite adjustment, but rather merely enable only stepwise or discrete handle adjustment.

The present invention solves the above-described problems by providing a handle that is inexpensive yet durable, that is simple to install and operate on a vehicle, and that has infinite and secure height adjustment.

SUMMARY OF INVENTION

Objectives of the present invention include providing a handle for manually movable vehicles which has infinite and secure height adjustment.

Another objective of the present invention is to provide such a handle which is inexpensive, durable, and easy to install and operate on a vehicle.

These objectives and advantages are obtained by an adjustable handle for a movable article, the handle including at least one handlebar for grasping by an individual, a height-adjustment assembly interconnecting the handlebar and the article, the assembly including at least a pair of clutch plates, wherein one of the clutch plates is secured to the handlebar and the other of the clutch plates is secured to the article; and a cam movable to a locked position for causing abutment of and friction between the clutch plates to prevent relative movement of the plates for securing the handlebar at a selected location, the cam being movable to an unlocked position for reducing friction between the plates to allow relative movement of the plates for adjusting the location of the handlebar.

BRIEF DESCRIPTION OF THE DRAWINGS

The preferred embodiment of the invention, illustrative of the best mode in which applicants have contemplated applying the principles, is set forth in the following description and is shown in the drawings and is particularly and distinctly pointed out and set forth in the appended claims.

Similar numerals refer to similar parts throughout the drawings.

DESCRIPTION OF THE PREFERRED EMBODIMENT

Figure 1:
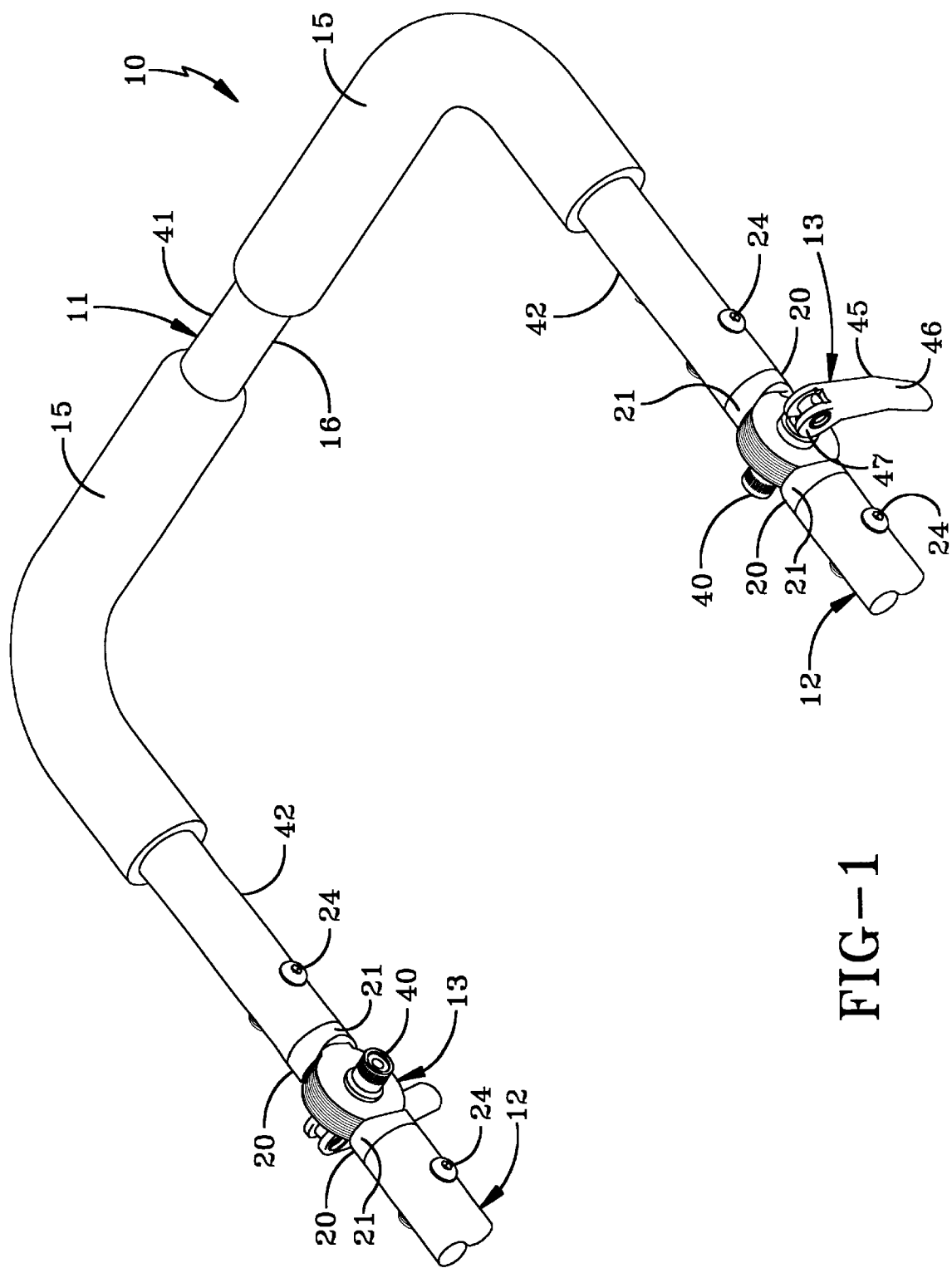
FIG. 1 is a fragmentary perspective view of the adjustable handle of the present invention useful in manually movable vehicle applications.

The adjustable handle of the present invention useful in manually moving a small vehicle such as a stroller or the like, is indicated generally at 10 and is shown in FIG. 1. Adjustable handle 10 includes a one-piece U-shaped handlebar 11, a pair of spaced-apart, parallel extension rods 12, and a pair of height-adjustment assemblies 13 securely disposed between and interconnecting the extension rods and the handlebar.

More particularly, U-shaped handlebar 11 is a tube formed of any suitable sturdy material such as metal or plastic. Handlebar 11 includes a transverse portion 41 and a pair of longitudinal portions 42. A tubular grip 15, formed of any suitable material such as rubber or foam, is friction fit about a portion of each longitudinal handlebar portion 42 and extends about a portion of transverse handlebar portion 41. It is understood that handlebar 11 can be any shape, and can be embodied as two separate members or even a plurality of members depending upon the number of people who are imparting motion to the vehicle to be moved, without affecting the overall concept of the present invention. Moreover, it is further understood that handlebar 11 can be attached to a single extension rod 12 and a single height-adjustment assembly 13, also without affecting the concept of the invention. In addition, it should also be understood that the present invention contemplates that handlebar 11 and height-adjustment assembly 13 can be attached directly to a small vehicle without the use of extension rods 12.

Each extension rod 12 is an elongated tube formed of any suitable sturdy material such as metal or plastic. The length of each rod 12, which typically are identical, depends on the application for adjustable handle 10 and the optimum leverage obtainable.

Figure 2:
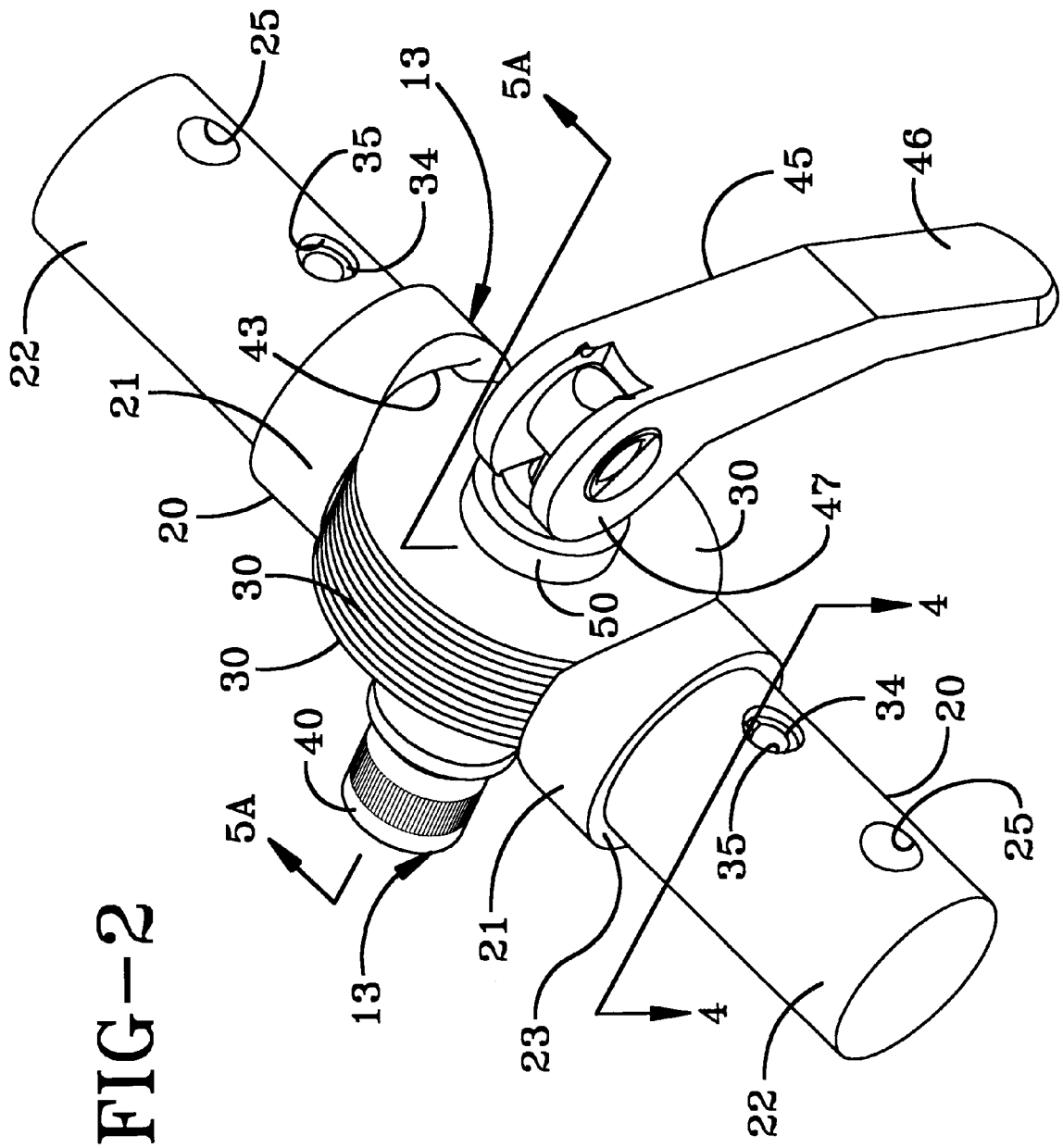
FIG. 2 is an enlarged fragmentary perspective view of one of the height-adjustment assemblies of the handle, shown in a locked or non-adjustment position.

In accordance with one of the main features of the present invention, each one of the pair of height-adjustment assemblies 13 (FIGS. 2 and 3), is disposed between and securely mounted to a respective one of the pair of extension rods 12 and its respective longitudinal handlebar portion 42 (FIG. 1). Since height-adjustment assemblies 13 are identical in structure and operation, only one will be described hereinbelow. More specifically, height-adjustment assembly 13 includes a pair of oppositely longitudinally extending inserts 20, and since inserts 20 also are identical, only one will be described in detail. Insert 20 is a one-piece truncated tube closed at both of its ends, and preferably is formed of any suitable material such as powder metal. Insert 20 includes a first section 21 having an outside diameter slightly larger than the outside diameter of a second section 22 of the insert, but generally equal to the outside diameter of longitudinal handlebar portions 42 and extension rods 12. The outside diameter of insert second section 22 is nominally smaller than the inside diameter of longitudinal handlebar portions 42 and extension rods 12, thus creating a tight friction fit when second section 22 is inserted in longitudinal handlebar portion 42 and extension rod 12. A shoulder 23 is formed at the interface of first and second insert sections 21 and 22, respectively, due to the difference in outside diameter between the two sections, and acts as a stop to prevent over-insertion of insert 20 into longitudinal handlebar portion 42 and extension rod 12. It can be appreciated that any suitable fastener 24 can be passed through a pair of aligned first openings 25 formed in insert 20 and a pair of aligned openings (not shown) formed in its respective longitudinal handlebar portion 42 or extension rod 12. This construction prevents rotation of insert 20 in its respective handlebar portion 42 or extension rod 12. The inside surface of insert 20 defines a generally square-shaped opening 26 (FIGS. 3 and 4), the significance of which will be described below.

Figure 3:
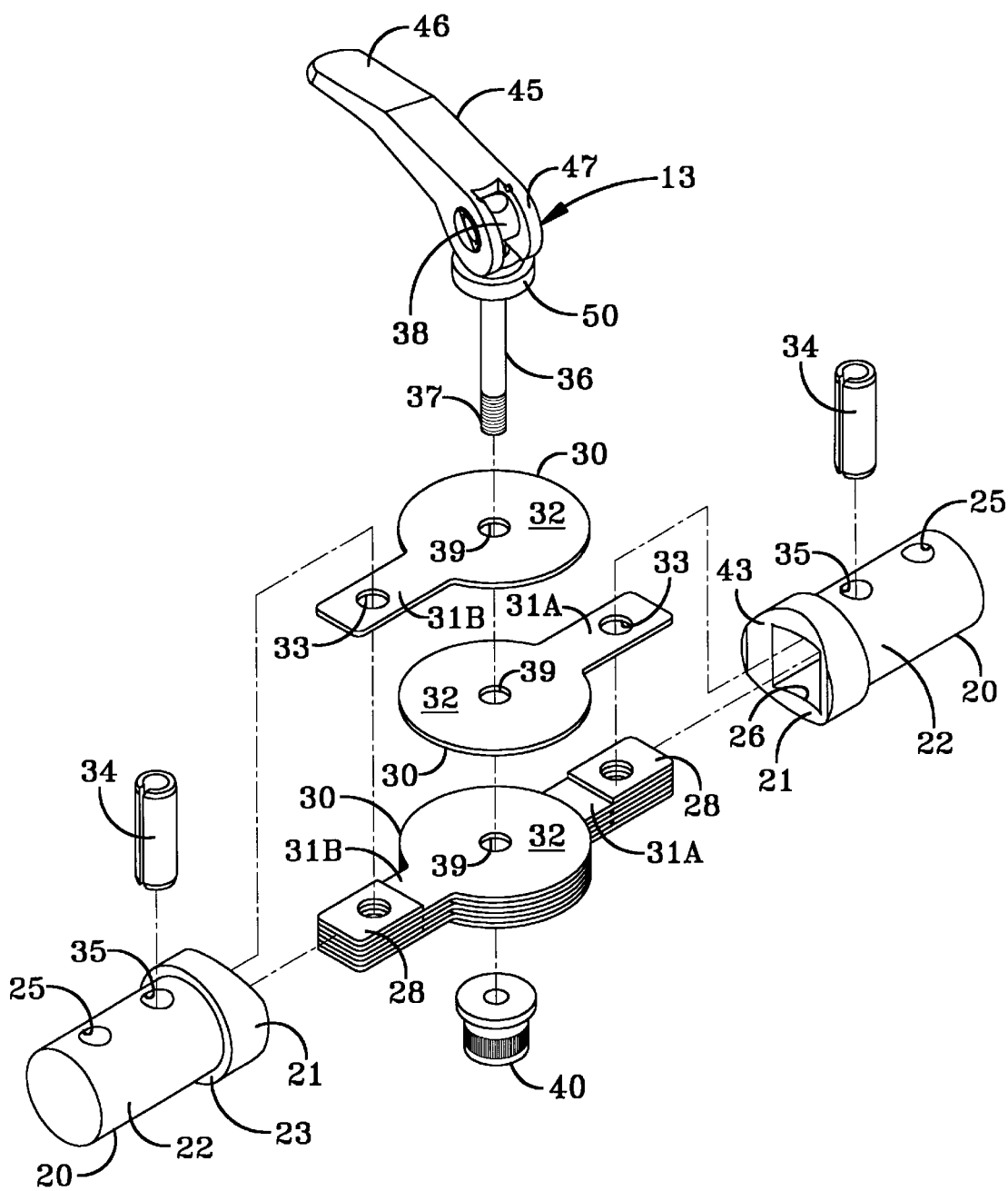
FIG. 3 is an exploded perspective view of the assembly of FIG. 2.
Figure 4:
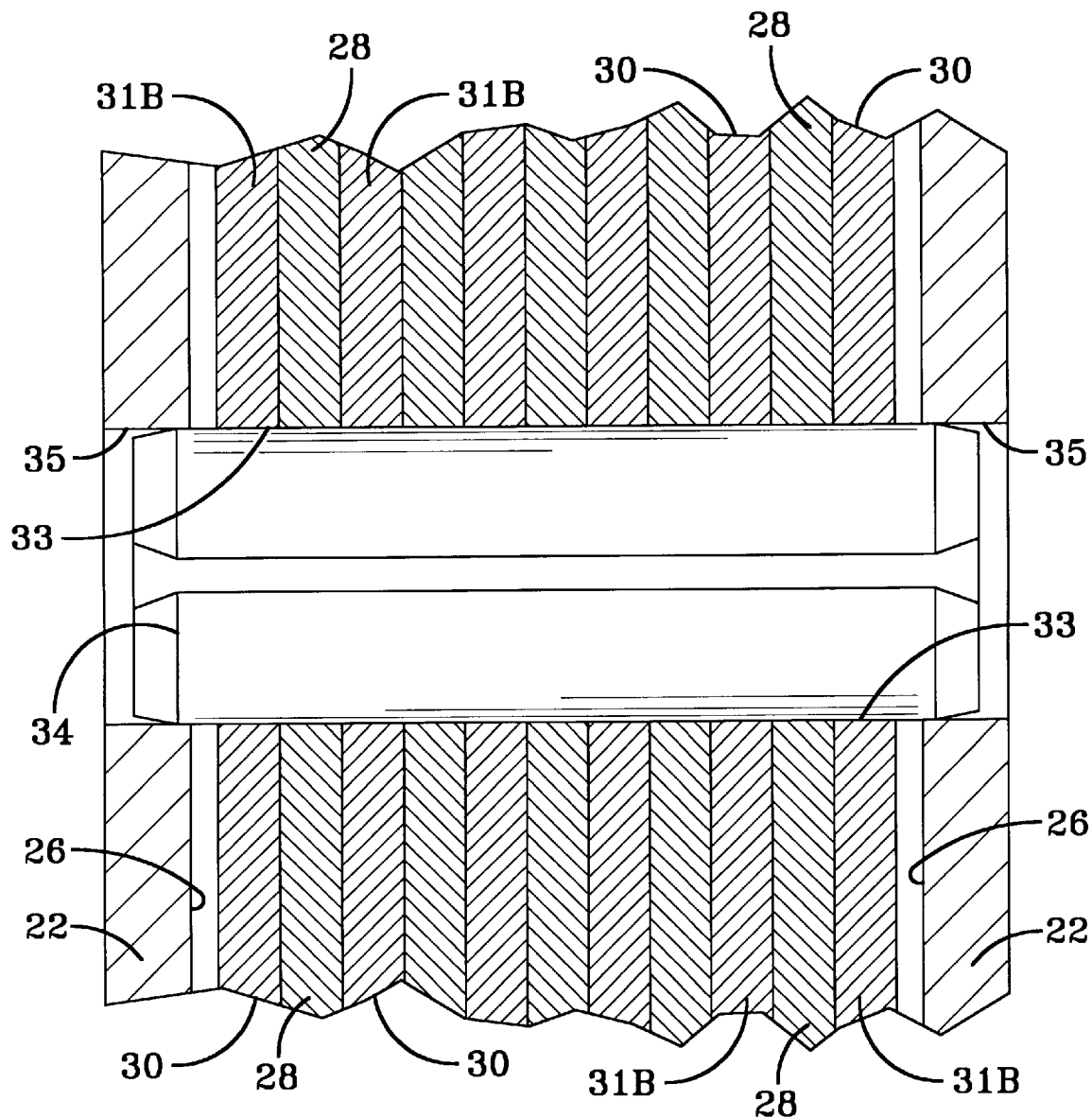
FIG. 4 is a sectional view taken along lines 4—4 of FIG. 2.

In accordance with another key feature of the present invention, a plurality of friction or clutch plates 30 (FIG. 3), each of which is formed of any suitable metal such as stainless steel and has a generally rectangular-shaped portion 31 and an enlarged generally circular-shaped portion 32, are sandwiched together in an alternating arrangement. In particular, every other one of clutch plates 30 has its rectangular portion 31A disposed in the same direction, and the other ones of clutch plates 30 each has its rectangular portion 31B disposed in the opposite direction. A metal spacer 28 formed with an opening is inserted between each pair of adjacent and aligned rectangular plate portions 31A and 31B (FIGS. 3 and 4). Rectangular portions 31A of certain ones of clutch plates 30 are inserted into square-shaped opening 26 of a certain one of inserts 20 which in turn is inserted into longitudinal handlebar portion 42, and rectangular portions 31B of the other ones of clutch plates 30 are inserted into square-shaped opening 26 of the other one of inserts 20 which in turn is inserted into extension rod 12. Rectangular portion 31 of each clutch plate 30 is formed with an opening 33. The openings formed in metal spacers 28 are aligned with openings 33 formed in rectangular plate portions 31. A spring pin 34 is passed through the aligned openings of spacers 28 and openings 33 and the ends of the spring pin each is press fitted within a respective one of the pair of aligned second openings 35 formed in each insert 20 to secure the clutch plates in position in the inserts. The rectangular ends 31 of clutch plates 30 and spacers 28 are free to move along the length of spring pins 34 within insert opening 26, but are prevented from rotating within insert 20 as best shown in FIG. 4. A section of the periphery of the circular-shaped portion 32 of each clutch plate 30 rests in a complementary-shaped curved surface 43 of each insert first section 21.

A bolt 36 having a threaded end 37 and a specially adapted head 38 is passed through an opening 39 formed in circular portion 32 of each clutch plate 30. A knurled nut 40 threadably engages threaded end 37 of bolt 36 and is irremovable therefrom due to scoring of the threads of threaded end 37 after assembly. A locking lever 45 includes a grasping end 46 and a cam end 47, and the cam end is pivotally attached to the specially adapted bolt head 38 in a manner well known to the art and to the literature. A spacer 50 is slidably disposed on bolt 36 and is captured thereon by the outermost clutch plate 30 and cam end 47.

Figure 5A:
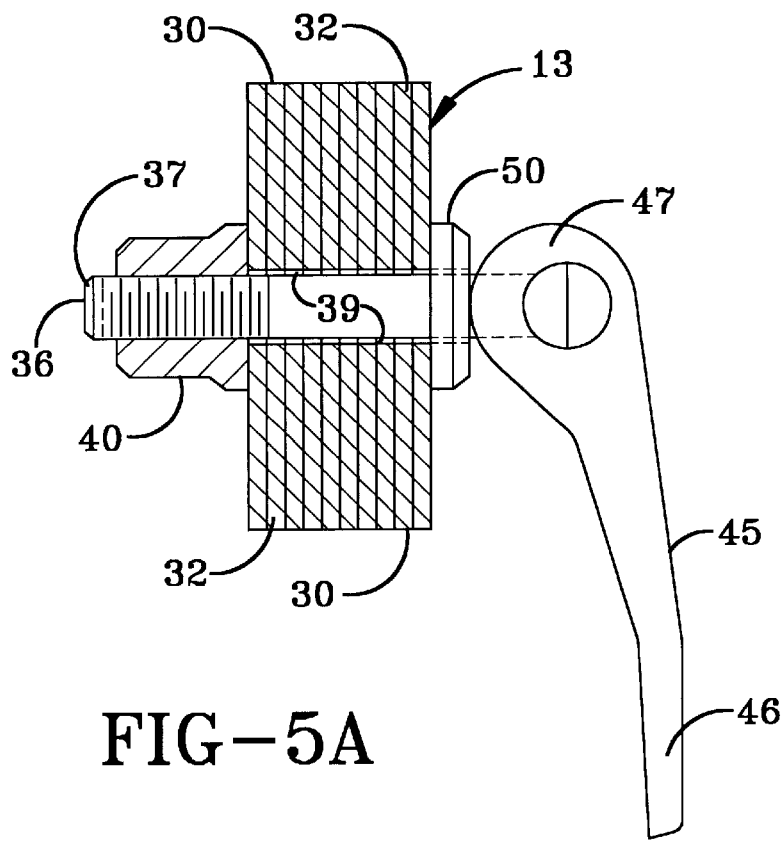
FIG. 5A is a sectional view taken along lines 5A—5A of FIG. 2, and showing the assembly in the locked position.
Figure 5B:
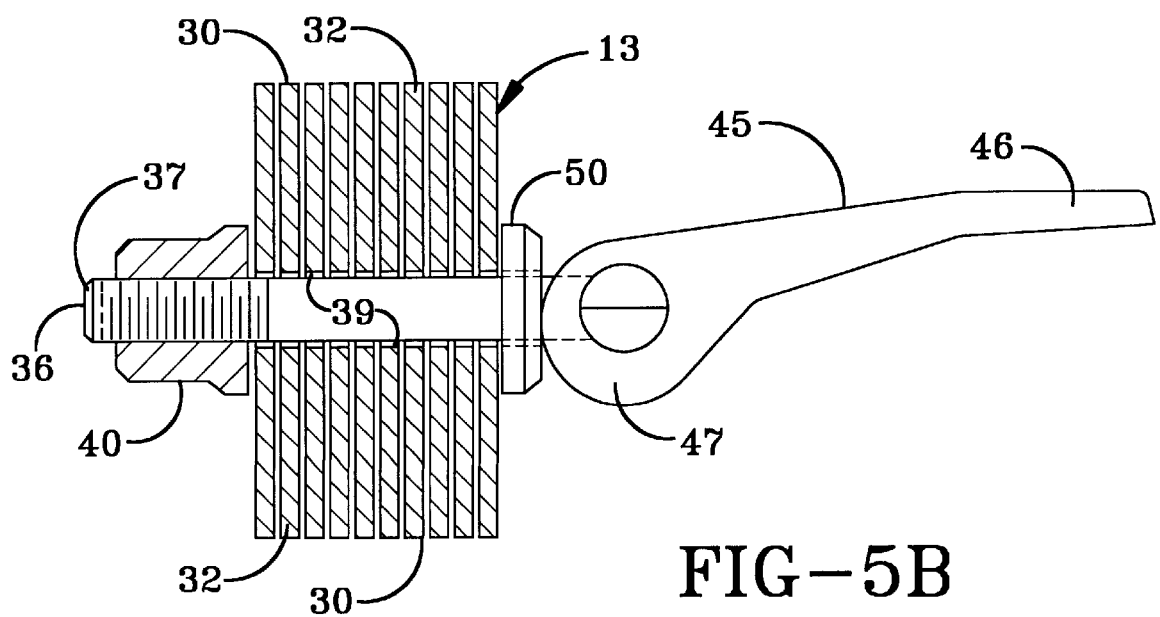
FIG. 5B is a view similar to FIG. 5A, but showing the assembly in an unlocked or adjustment position.
Figure 6:
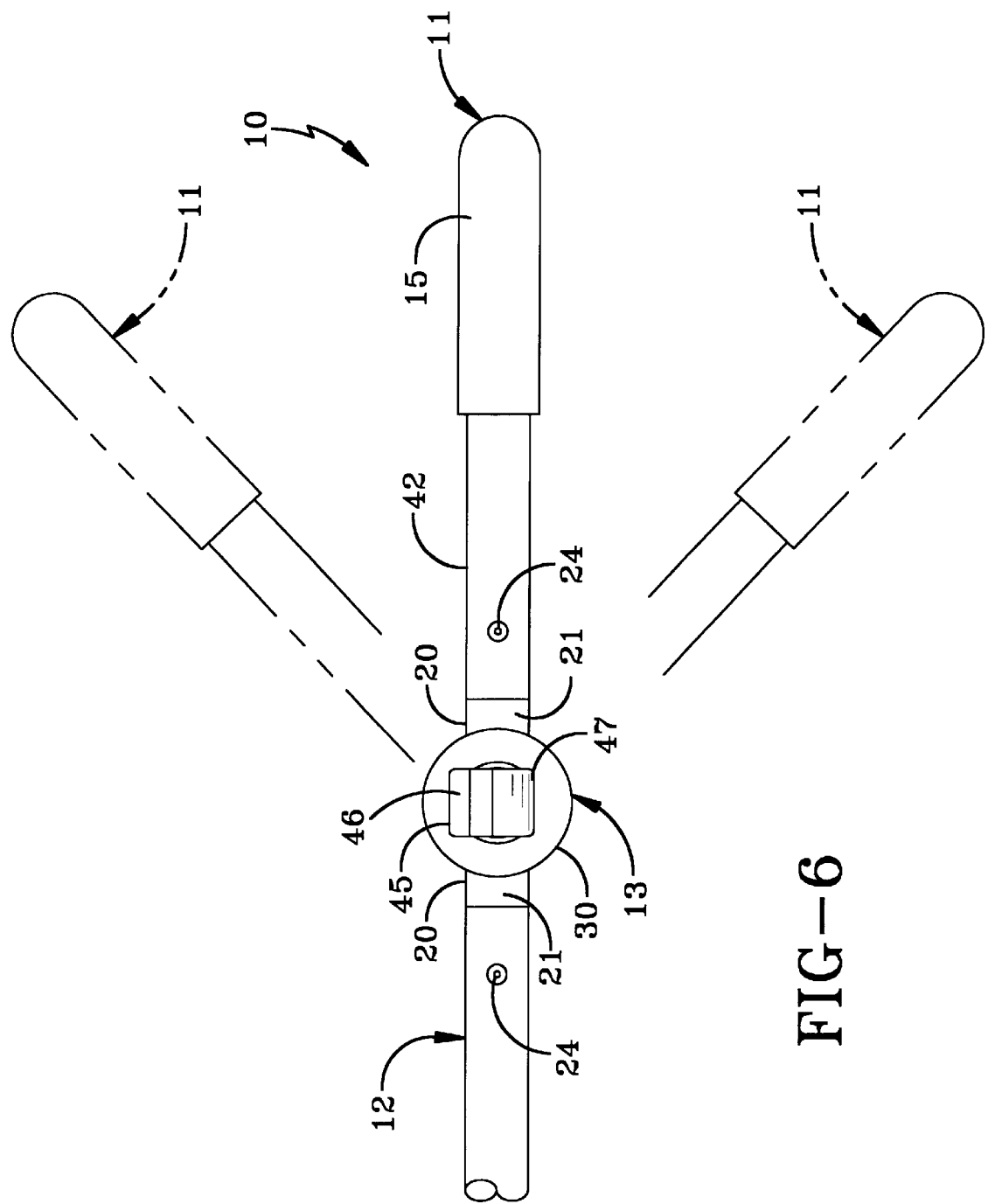
FIG. 6 is a side view of the handle, but with the height-adjustment assemblies in an unlocked position, and showing in phantom lines the type of infinite height adjustment which can be achieved by the adjustable handle of the present invention.

The operation of adjustable handle 10 of the present invention now can be described. When it is desired to adjust the height of handlebar 11 so that an individual moving the vehicle to which the handle is attached can obtain the greatest leverage and/or comfort, locking levers 45 each are moved from the locked or non-adjustment position shown in FIGS. 1, 2 and 5A, by manually pivoting grasping end 46 upwardly to an unlocked or adjustment position shown in FIG. 5B. It can be seen in FIGS. 5A and 5B that cam end 47 reduces the friction between clutch plates 30 due to its shape by reducing the amount of force imparted by the cam end against spacer 50, and in turn against clutch plates 30 and nut 40, as locking lever is pivoted from the locked to unlocked position, and possibly even provides clearance to enable the spacer and plates to move apart slightly thereby enabling infinite upward or downward pivoting of handlebar 11 and its associated plates relative to extension rods 12, as best shown in FIG. 6 in phantom lines. When locking lever 45 is returned to the locked position, the shape of cam end 47 eliminates any of the aforementioned clearance and forces spacer 50 against circular portion 32 of clutch plates 30 and in turn forces the plates against nut 40, thereby creating friction between the plates and preventing relative movement of the plates and securing handlebar 11 at a selected height.

It should be understood that in place of one or both separate inserts 20, the handlebar and/or article to which height adjustment assembly 13 is attached can be modified or adapted to attach directly to rectangular plate portions 31. It should also be understood that a single bolt 36, nut 40, spacer 50 and locking lever 45 can be employed in the present invention to control the locking and unlocking of a plurality of spaced-apart aligned sets of clutch plates 30, simply by extending the length of the bolt.

Thus, it can be seen that adjustable handle 10 of the present invention can be utilized in a wide range of applications such as, for example, a baby stroller handle, a handle on the back of a wheelchair or similar device, and even a handle for a moveable article such as a lawn mower. The present invention also contemplates the use of adjustable handle 10 on vehicles and articles that can be self-propelled such as wheelchairs and lawn mowers, but which may still have an individual grasping a handle on the vehicle or article, and on vehicles and articles which are switchable between self-propelled and manual modes. The present invention also contemplates the use of adjustable handle 10 in applications where adjustments other than height are desirable, such as horizontal or side-to-side handle adjustment. Moreover, adjustable handle 10 is inexpensive and durable, easy to assemble and use, and provides an efficient way to achieve infinite yet stable height adjustment of a handlebar to provide the greatest leverage and/or comfort to the individual moving the vehicle to which the handlebar is attached.

Accordingly, the adjustable handle of the present invention for use in manually movable vehicles is simplified, provides an effective, safe, inexpensive, and efficient adjustable handle which achieves all of the enumerated objectives, provides for eliminating difficulties encountered with prior adjustable handles, and solves problems and obtains new results in the art.

In the foregoing description, certain terms have been used for brevity, clarity, and understanding; but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the adjustable handle for manually movable vehicles is constructed, arranged, and used, the characteristics of the construction and arrangement, and the advantageous, new and useful results obtained; the new and useful structures, devices, elements, arrangements, parts, and combinations are set forth in the appended claims.

What is claimed is:

1. An adjustable handle for a movable article, said handle including:
   a) at least one handlebar for grasping by an individual;
   b) a height-adjustment assembly interconnecting said handlebar and said article, said assembly including at least a pair of clutch plates, wherein one of said clutch plates is secured to the handlebar and the other of the clutch plates is secured to the article, each of said clutch plates including a generally circular-shaped portion and a reduced sized generally rectangular portion, the plates being arranged in alternating fashion so that every other one of said clutch plate portions extend in a first direction and the other ones of said clutch plate rectangular portions extend in a second direction opposed to said first direction; and
   c) a cam movable to a locked position for causing abutment of and friction between said clutch plates to prevent relative movement of the plates for securing the handlebar at a selected location, said cam being movable to an unlocked position for reducing friction between said plates to allow relative movement of the plates for adjusting the location of the handlebar and said cam further being a lever pivotally attached to a bolt which passes through aligned openings formed in said clutch plates; in which an end of said lever proximal to said bolt is formed with a cam surface and an end of the lever distal from the bolt can be grasped by an individual; in which a first spacer is slidably mounted on said bolt and is captured between said cam surface and the clutch plates and a second spacer is located between each aligned adjacent pair of clutch plate rectangular portions; in which upon grasping and pivotal movement of the lever in a first direction, the cam surface forces said first spacer against said plates which in turn are forced against a nut threadably engaged on an end of the bolt opposite from said lever, whereby said plates are moved into frictional abutment; and in which upon pivotal movement of the lever in a second direction opposite from said first direction, said cam surface retracts, whereby friction between said plates is reduced.

2. The adjustable handle of claim 1, in which said height adjustment assembly includes a plurality of said clutch plates.

3. The adjustable handle of claim 1, in which an extension rod is disposed between and interconnects said article and said height-adjustment assembly; in which said handlebar and said extension rod each is tubular; in which said height-adjustment assembly includes a pair of inserts each of which is slidably frictionally received and secured within a respective one of said tubular handlebar and said tuibular extension rod; in which an outer surface of an end of each of said inserts proximal to said clutch plates has a shape complementary to the curved periphery of a section of said circular-shaped portion of said plates; in which an interior surface of each of said inserts defines a generally square-shaped opening; and in which said rectangular-shaped portion of certain ones of the plates is received and secured in said square-shaped opening of said handlebar insert, and the rectangular-shaped portion of the other ones of said plates are received and secured in said square-shaped opening of said extension rod insert.

4. The adjustable handle of claim 3, in which an aligned first pair of openings is formed in each of said inserts distal from said clutch plates; in which said first pair of openings of each insert is aligned with a respective aligned pair of openings formed in said handlebar and said extension rod; and in which a fastener passes through each aligned pairs of openings to secure each of said inserts in a respective one of the handlebar and the extension rod.

5. The adjustable handle of claim 4, in which an opening is formed in said rectangular-shaped portion of each of said clutch plates and in each of said second spacers; in which a second pair of aligned openings is formed in each of said inserts proximal to the clutch plates; and in which a fastener is passed through each of the insert second pair of aligned openings and respective ones of said clutch plate rectangular-shaped portion openings and respective ones of said second spacer openings to secure said plates within a respective one of said inserts.

6. The adjustable handle of claim 5, in which said clutch to plate rectangular-shaped portion fastener is a spring pin.

7. The adjustable handle of claim 3, in which a shoulder is formed on an outer surface of each of said inserts to prevent overinsertion of each of the inserts into a respective one of said handlebar and said extension rod.

8. The adjustable handle of claim 7, in which said extension rod is elongated.

9. The adjustable handle of claims 8, in which said handlebar is a generally U-shaped member having a transverse portion and a pair of spaced apart parallel longitudinal portions; in which said handle includes a pair of spaced-apart extension rods; and in which each of said handlebar longitudinal portions is aligned with a respective one of said extension rods.

10. The adjustable handle of claim 9, in which at least one grip is frictionally fitted on said handlebar; in which said article is manually movable; and in which the height of said handle is infinitely adjustable.

11. The adjustable handle of claim 1, in which said nut is irremovably threadably mounted on said height-adjustment assembly bolt.

* * * * *